United States Patent [19]
van der Ent

[11] Patent Number: 5,865,106
[45] Date of Patent: Feb. 2, 1999

[54] SANDWICH COOKIE MAKING MACHINE

[76] Inventor: Johannes G. van der Ent, HD Automation, Inc. 112 Iken Cir., Goose Creek, S.C. 29445

[21] Appl. No.: 110,095

[22] Filed: Jul. 2, 1998

[51] Int. Cl.[6] ............... A21C 9/04; A21C 9/08; A21C 15/02; A21C 15/04

[52] U.S. Cl. ............. 99/450.4; 99/450.1; 99/450.7

[58] Field of Search ................ 99/450.1, 450.4, 99/450.5, 450.2, 450.6, 450.7, 494, 537, 352–355; 53/532, 534; 221/266, 298; 426/496, 502, 274, 275, 519; 425/289, 298, 382.3, 383; 198/418.4, 434

[56] References Cited

U.S. PATENT DOCUMENTS

| | | | |
|---|---|---|---|
| 3,783,772 | 1/1974 | Fay ........................................... | 99/450.4 |
| 4,098,909 | 7/1978 | Mims ........................................ | 426/274 |
| 4,114,524 | 9/1978 | Welch ....................................... | 99/450.4 |
| 4,194,443 | 3/1980 | Mims ................................. | 99/450.7 X |
| 4,329,920 | 5/1982 | Rose et al. ........................... | 221/266 X |
| 4,421,019 | 12/1983 | Hocking ............................... | 221/298 X |
| 4,440,072 | 4/1984 | Haas, Sr. et al. ........................ | 99/450.4 |
| 4,513,656 | 4/1985 | Fay ........................................... | 99/450.4 |
| 4,583,053 | 4/1986 | Jasniewski ............................... | 425/289 |
| 4,595,099 | 6/1986 | Zaruba et al. ........................... | 99/450.5 |
| 4,615,264 | 10/1986 | Rose ................................... | 99/450.7 X |
| 4,622,264 | 11/1986 | Cramer et al. ........................... | 99/450.4 |
| 4,643,084 | 2/1987 | Gomez ....................................... | 99/352 |

Primary Examiner—Timothy F. Simone
Attorney, Agent, or Firm—D. Peter Hochberg

[57] ABSTRACT

A sandwich cookie making machine receives cookie halves from an oven. The cookie halves are then aligned by a servo driven aligner. The cookie halves are transferred to a first chain assembly that transports the cookie halves to a depositor where cream is deposited on every other cookie half. The cookie halves are then transferred to a second chain assembly that transports the cookie halves to a capper area. A series of tall and short lugs are fixed to the second chain assembly. The tall lugs push the cream deposited cookie halves and the short lugs push the non-deposited cookie halves. A capper wheel having a plurality of scoops spaced circumferentially about the capper wheel, lifts the non-deposited cookie halves from the chain assembly. The non-deposited cookie halves are rotated and inverted. The non-deposited cookie halves are supported above a deposited cookie half until one of the tall lugs pushes the non-deposited cookie half onto a deposited cookie half forming a cookie sandwich. The cookie sandwiches are transported to a stacker for sorting and packaging.

19 Claims, 6 Drawing Sheets

SANDWICH COOKIE MAKING MACHINE

BACKGROUND OF THE INVENTION

1. Field of the Invention

This invention relates to the preparation of cookies and, in particular, to the making of sandwich cookies using two halves, applying cream on one half, capping the first half with the second half, and stacking the newly formed cookie sandwiches corresponding to the number of cookies to be packaged.

2. Description of the Prior Art

Most cookie makers are manually operated and require four to six people to put cookie halves into a cookie making machine. After the cookie halves are made into cookie sandwiches, another four to six people are required to remove the cookies from the cookie malting machine and load them into a cookie packaging machine. Additionally, some types of cookie making machines are vacuum operated. Vacuum operated machines require a pneumatic air source. These types of machines are very difficult to clean. Cleaning is a very important aspect of a cookie making machine because cookie making machines have to be able to make large number of many types of cookies.

Past sandwich cookie making machines place non-deposited cookie halves over cream deposited cookie halves by transporting the cookie halves in planes having different heights. For example, U.S. Pat. No. 3,783,772 uses a pinwheel for transporting non-deposited cookie halves from a first conveyor system onto a second higher conveyor system. The second conveyor system moves the non-deposited cookie half onto a pusher plate for depositing onto the creamed cookie halves. This mechanism includes many parts that need to be cleaned and include hard to reach areas during cleaning.

U.S. Pat. No. 4,329,920 discloses a sandwiching machine and turn-over mechanism that requires manual intervention. Cookie halves are loaded into magazines at first and second locations. At the first location, the manually loaded cookie halves are inverted by a turnover wheel and placed on a conveyor. The cookie halves have cream deposited on them and then move along the conveyor until they reach a second location. At the second location, a second cookie half is placed on the first cookie half. This machine is easier to clean than U.S. Pat. No. 3,783,772; however, it requires several operators to load the cookie halves into the magazines.

The present invention solves the problem with the prior art by providing a fully automated sandwich cookie making machine that is easily cleaned. The invention provides easily accessible parts, and parts that are also easy to disassemble and easy to maintain.

SUMMARY OF THE INVENTION

In accordance with a preferred embodiment of the present invention, there is provided a cookie making machine for taking two cookie halves, applying a food additive to one of the halves and capping that half with another half to form a cookie sandwich.

In a preferred aspect of the present invention, the sandwich cookie making machine includes an input means for inputting a plurality of first and a second cookie halves to the machine, and transport means for moving the cookie halves along the machine. The transport means includes pushing means for engaging the cookie halves as the transport means moves the cookie halves along the cookie making machine. The transport means moves the cookie halves to a depositor means for adding a food additive. The food additive is added to each of the first cookie halves. The cookie halves then travel to a capping means. The capping means includes scooping means arranged on the capping means for engaging and lifting the second cookie halves from the transport means. The capping means transfers the second cookie halves from the transport means along a predetermined path and places each of the second cookie halves over one of the first cookie halves. The pushing means moves the second cookie halves from the scooping means onto one of the first cookie halves to form a cookie sandwich. The transport means then moves the cookie sandwiches to a collecting means where the cookie sandwiches are collected and stacked.

In another preferred aspect of the present invention, there is provided a sandwich cookie making machine having input means for inputting a plurality of first and second cookie halves into the cookie making machine. Depositing means is provided for depositing food additives onto the first cookie halves. The cookie making machine further includes a first and a second chain assembly for continues movement of the cookie halves through the cookie making machine. The first chain assembly comprises a pair of chains with a pair of parallel wires running in the middle of the chains. The first chain assembly includes lug pairs for engaging the cookie halves, and moving the cookie halves from the input means to the depositor means and then to the second chain assembly. The second chain assembly comprises a single chain that moves in a continuous fashion, and includes a plurality of alternating tall lug pairs and short lug pairs. The tall lug pairs push the first cookie halves and the short lug pairs push the second cookie halves along the cookie making machine. The cookie making machine has a capper wheel that includes a plurality of scoops around the circumference of the capper wheel. The capper wheel moves in an indexing fashion. Each of the scoops move one of the second cookie halves from the second chain assembly and supports the second cookie half as the capper wheel rotates the second cookie half along a predetermined circular path. The second cookie half is inverted and held above one of the first cookie halves after one of the indexing motions of the capper wheel. One of the tall lugs pushes the second cookie half from the scoop onto one of the first cookie halves to form a cookie sandwich. The cookie sandwiches are moved by the second chain assembly and pushed by the tall lugs to a collecting means for collecting the sandwich cookies.

The general object of the present invention is to provide an improved sandwich cookie making machine that can take cookie halves taken directly from an oven, apply food additive to the first cookie halves, cap the first cookie halves with the second cookie halves to make cookie sandwiches, and package those cookie sandwiches, using fewer employees than existing sandwich cookie making machines.

Another object of the present invention is to provide the above stated sandwich cookie making machine that operates and accomplishes the above tasks without any manual intervention.

Another object of the present invention is the provision of a sandwich cookie making machine that is easy to disassemble and clean.

A further object of the present invention is to provide a sandwich cookie making machine that requires a very small amount of maintenance.

Another object of the present invention is to provide a sandwich cookie making machine that is inexpensive and simple to manufacture.

Yet another object of the present invention is to provide a sandwich cookie making machine that is simple to setup and operate.

These and other objects will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DESCRIPTION OF THE PREFERRED EMBODIMENT

Figure 1:
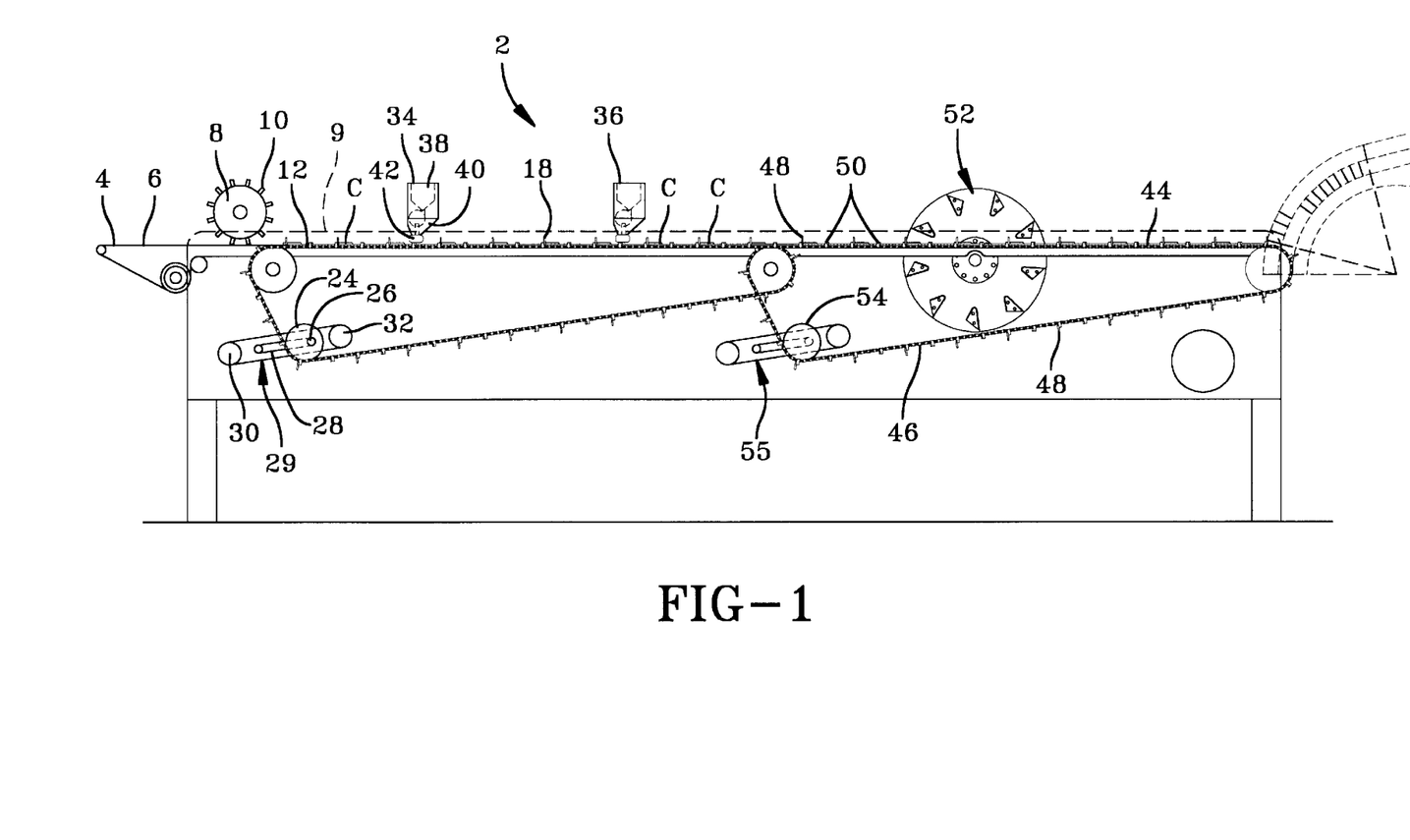
FIG. 1 is a side view of a preferred embodiment of the invention.

Referring now to the drawings wherein the showings are for the purpose of illustrating the preferred embodiment of the invention only, and not for the purpose of limiting the same, FIG. 1 shows a sandwich cookie making machine 2. It can be appreciated that a plurality of sandwich cookie machines can be aligned side by side. The preferred number is twenty four; however, as many machines as necessary can be used depending on production needs, size of plant facility, and on-hand materials. Returning to FIG. 1, baked cookie halves C are discharged from an oven (not shown), go through a cooling station (not shown) and are transferred to parallel product infeed belts 4 and 6. In a preferred embodiment, these belts are about ½-inch wide and are made from polyurethane. The polyurethane belts are endless and move in a rapid fashion in a clockwise direction. Product infeed belts 4 and 6 transfer the cookie halves side-by-side beneath a servo-driven aligner 8. Aligner 8 has a series of guide pins 10 that go between the cookie halves as aligner 8 rotates to separate the cookie halves. There could be a number of aligners driven by a single drive shaft. In a preferred embodiment, there are twenty four aligners, one on each cookie making machine.

Figure 2:
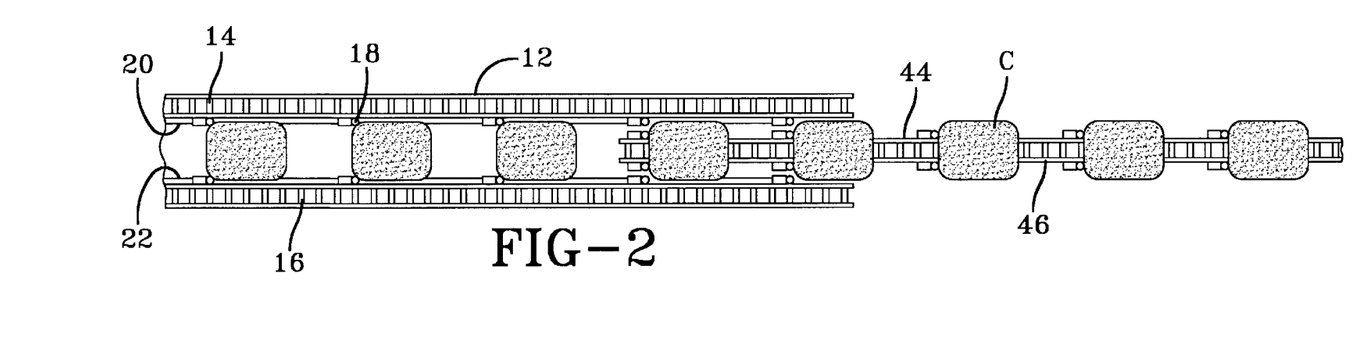
FIG. 2 is a top view of a first and second chain assembly.
Figure 3:
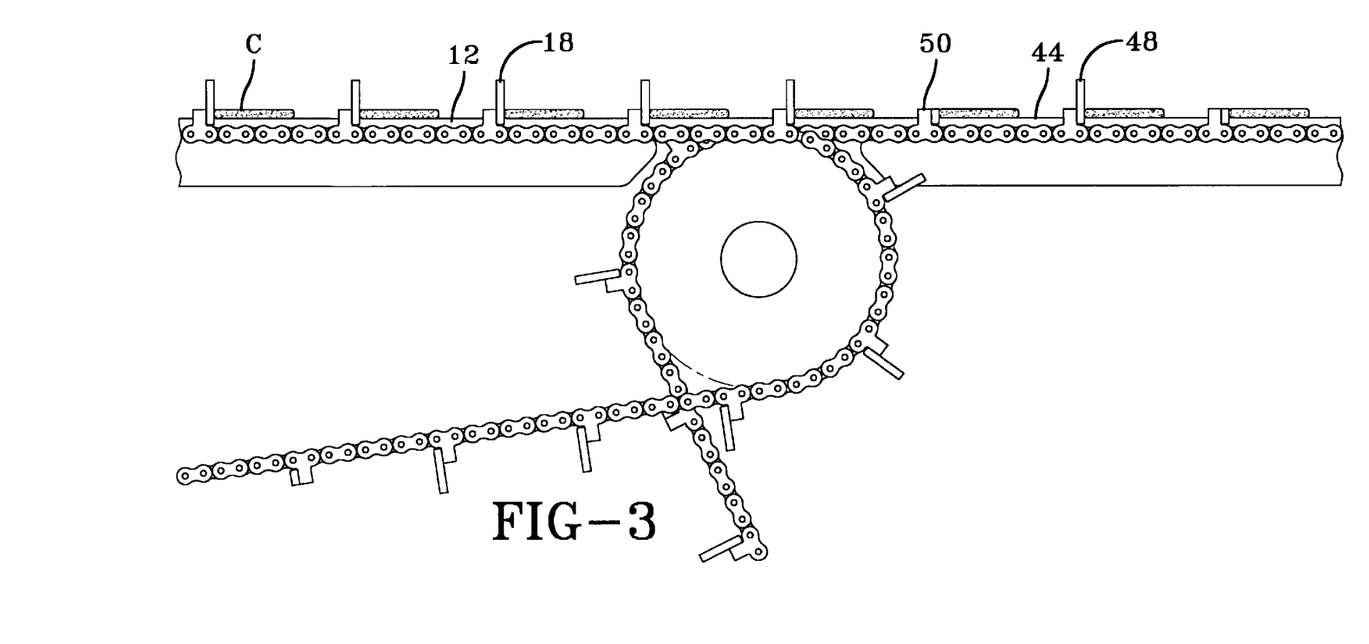
FIG. 3 is a side view of the first and second chain assembly.

Cookie halves are transferred from the continuous belts to a continuous running first chain assembly 12 having a pair of chains 14 and 16 (FIG. 2), which also move in the clockwise direction. A series of pairs of pushers or transport pins 18 are affixed to chains 14 and 16 as best shown in FIG. 2 and FIG. 3. Transport pins 18 engage the ends of the cookie halves as the cookie halves move from the fast moving continuous belt to a pair of parallel wires 20 and 22 (FIG. 2). Parallel wires 20 and 22 are positioned in the middle of chains 14 and 16. Just as it is preferable to have twenty four aligners 10, it would be preferable to have twenty four pairs of chains 14 and 16, each having between them a pair of wires 20 and 22 for supporting the cookie halves. As can be seen in FIG. 2, the cookie halves are preferably generally rectangular or round shaped with rounded corners. The pair of pusher pins engage the rear corner of each cookie half C. The tension in chain assembly 12 is adjusted by means of an idler wheel 24 that is rotated on a central shaft 26 extending through a slot 28 in an idlerwheel support 29. The position of shaft 26 and slot 28 locates idler wheel 24, and establishes the tension. Two additional shafts 30 and 32 associated with idler wheel 24 have two purposes, namely, they bolt the machine parts together, and carry the tensioners.

Continuously moving chains 14 and 16 move the cookie halves by means of the pusher or transport pins 18 beneath a first depositor head 34, which is a cream depositor. Depositor head 34 moves with the cookie halves in an oscillatory motion driven by a servo motor (not shown). The speed of depositor head 34 determines how the cream is placed on the cookie halves. The cream could be placed as dots when the depositor head moves at the same rate as the chain, or as stripes when the depositor head and chain move at different rates of motion. Depositor head 34 includes a pressure chamber 38 with a rotating valve 40 for measuring the amount of cream deposited by the depositor head. The cream flows from depositor valve 40 through a nozzle 42 to the cookie half. The creamer deposits the cream on every other cookie half. A second identical depositor head 36 can also be provided for adding a separate flavor or separate color on top of the cream from first depositor head 34. It should be appreciated that the depositor heads are not limited to cream but could include other food additives such as peanut butter, jelly, chocolate or vanilla flavoring or the like.

Figure 4:
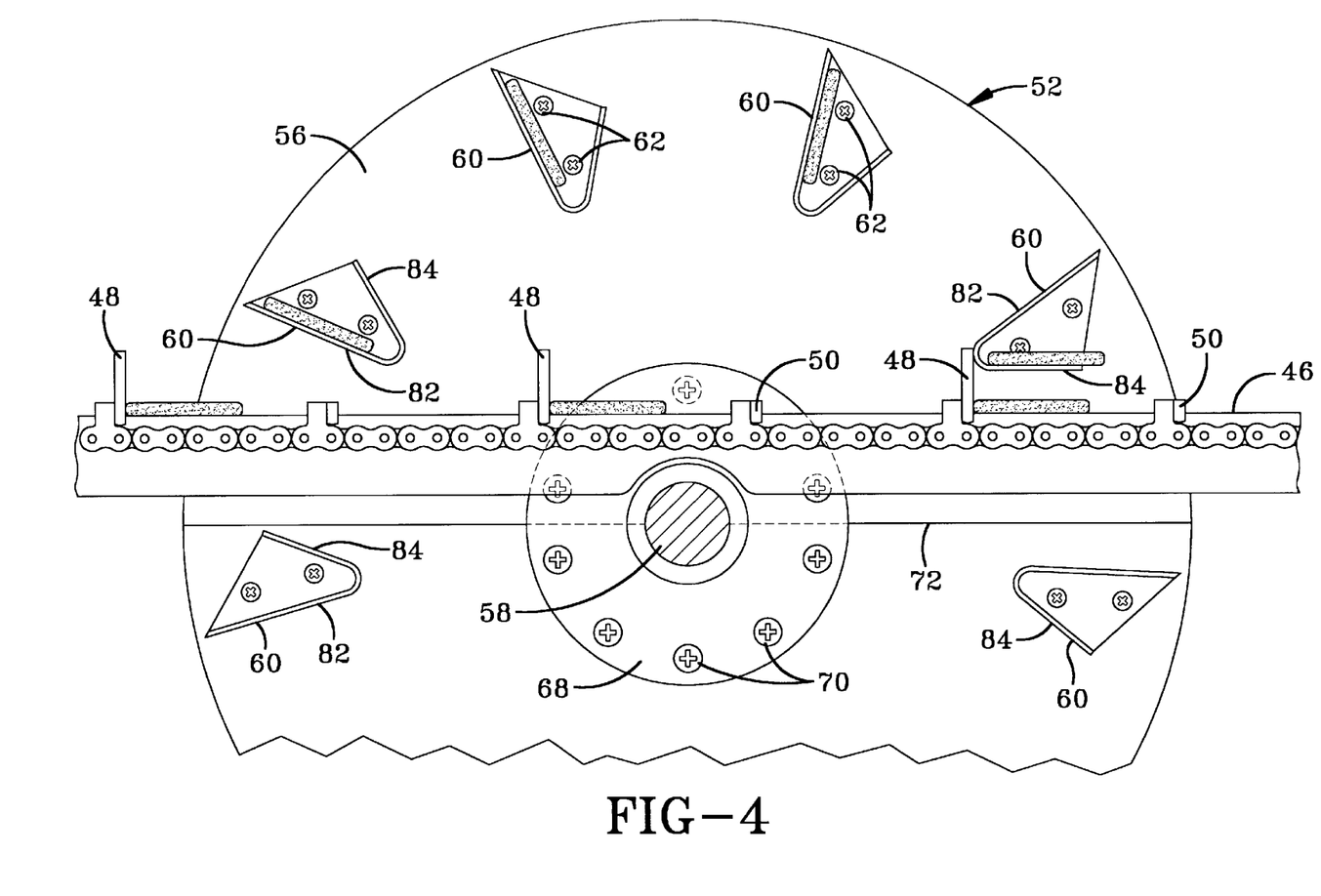
FIG. 4 is a side view of a capper wheel.
Figure 5:
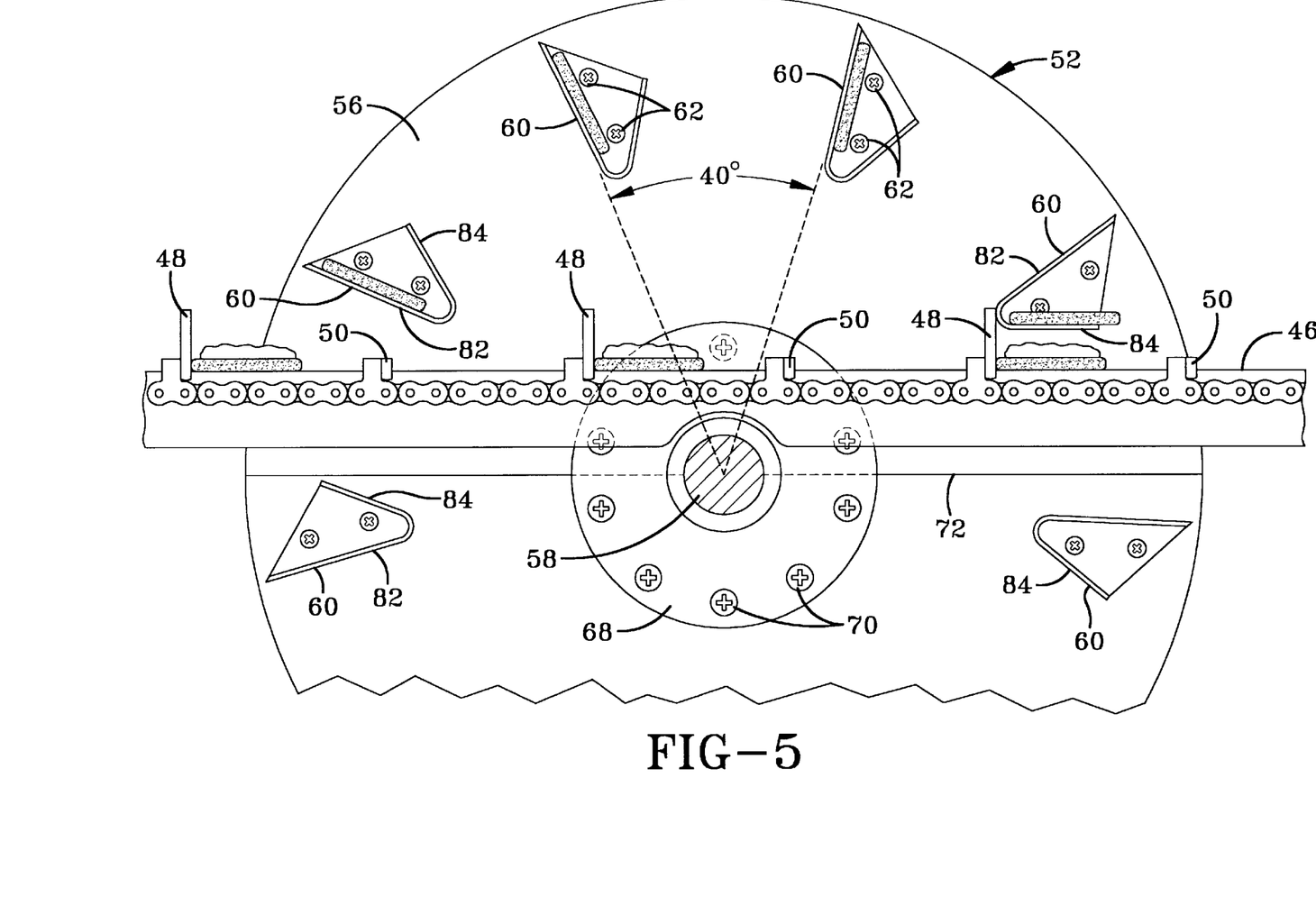
FIG. 5 is another side view of the capper wheel.

The cookie halves are transferred from the wires 20 and 22 between attachment chains 14 and 16 to a second continuous chain assembly 44 having a single attachment chain 46. The chains in both the first and second chain assembly can be Tsubaki attachment chains or the like. An idler wheel 54 is also provided for adjusting the tension of chain 46. The idler wheel arrangement is identical to the arrangement in chains 12 and 14 and is mounted on second idler wheel support 55. Importantly, as can be seen in FIG. 1 and FIG. 3, single chain 44 has a series of alternating pairs of lugs, a pair of tall lugs 48 for pushing cookie halves with cream on them, and a pair of short lugs 50 for pushing empty or non-deposited cookie halves. The chain moves the cookie halves near a cookie capper 52. Referring to FIG. 4 and FIG. 5, cookie capper 52 comprises a large stainless-steel wheel 56 that is driven by a drive shaft 58. Wheel 56 has a series of radially placed scoopers or scoops 60, which are preferably made from Delrin and screwed to wheel 56 by hold-down screws 62. Chain 46 moves in a continuous fashion. Drive shaft 58 moves wheel 56 and scoops 60 in an intermittent or indexing fashion. Scoops 60 lift the empty cookies being pushed by short lugs 50 and rotate them around wheel 56 as chain 46 moves linearly, pushing only the cookies covered with cream. The first indexing moves the scoop from below chain 46 to above chain 46, as it picks up the uncreamed cookie. The lifted uncreamed cookies then will be moved during three indexes, each angularly separated by 40°. The final indexing moves the uncreamed cookie half slightly above chain 46, so that the uncreamed cookie half will be ready to be pushed out of scoops 60 by tall lugs 48, during a period of time where wheel 56 and drive shaft 58 are not moving. Once the uncreamed cookie is positioned by scooper 60 just over the creamed cookie that is being pushed by tall lugs 48, tall lug 48 pushes the uncreamed cookie from the scoop and on to the creamed cookie half. Tall lugs 48 continue pushing the cookie sandwich forwardly away from the cookie capper to the cookie collector and stacker described below.

Figure 6:
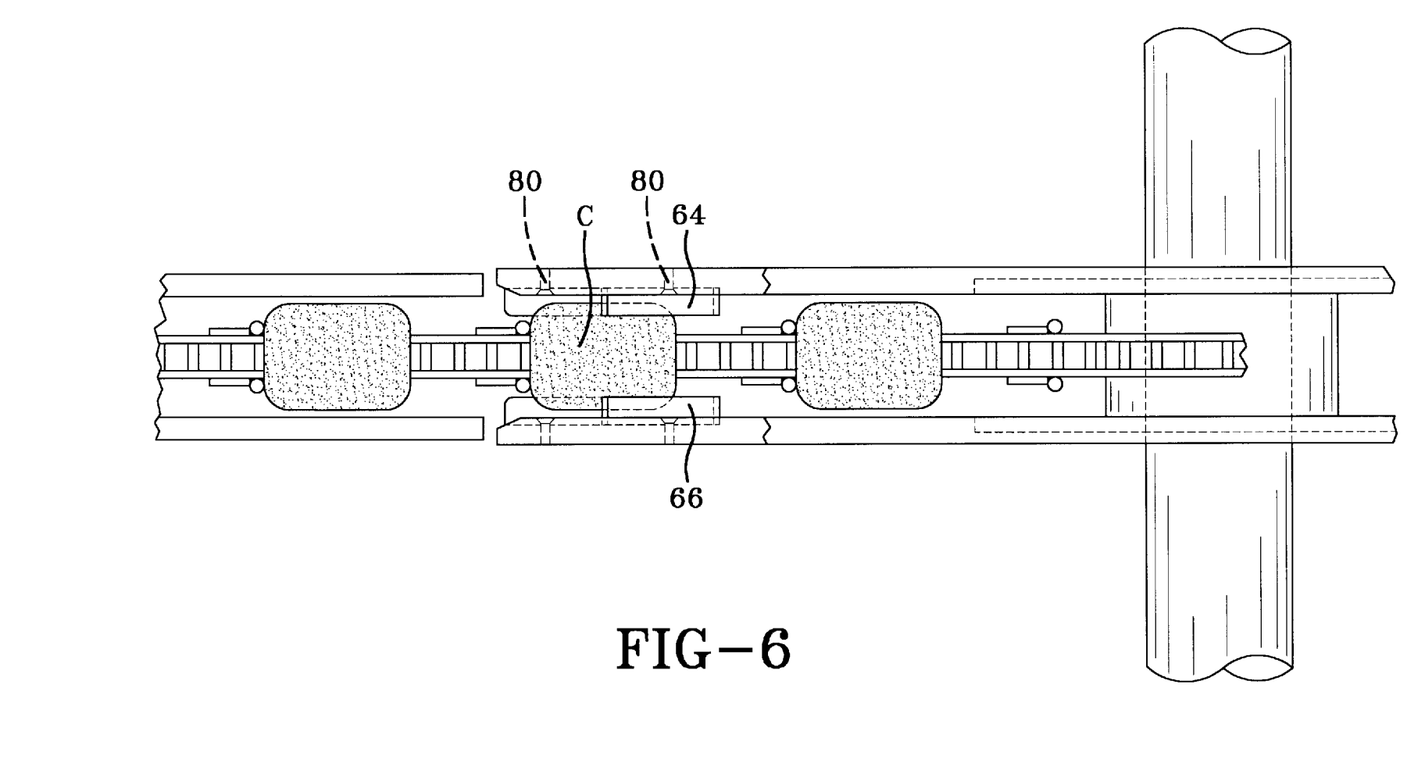
FIG. 6 is a top view of a number of scoops moving the cookie halves from the second chain assembly.

Referring to FIG. 5 and FIG. 6, it can be seen that scoop 60 involves a pair of members 64 and 66 that engage the parallel, longitudinal size of the cookie half C. The scoops 60 are located 40° apart on wheel 56. Wheel 56 is driven by drive shaft 58. A hub 68 is attached to wheel 56 and extends around drive shaft 58. A cut-out is provided on part of the machine to give access to the drive shaft. Hub 68 is preferably attached to the stainless-steel wheel or support wheel by a set of screws 70, although the hub could be welded to capper wheel 56. Capper wheel 56 has two halves, which meet at a seam 72. The scoop member 64 is attached to one half of the wheel by a pair set screws 80. The other scoop member 66 is attached to the other half of the wheel by another pair of set screws 80 When the two halves are assembled to form the capper wheel, the two scoop members 64 and 66 form a scoop 60. The scoop members are spaced apart from one another to form a gap. The gap is wider than the chain 46, but not as wide as the width of the cookie half. This allows the scoop to lift the cookie half from chain 46 without disturbing the rotation of chain 46. If hub 68 is removed, wheel 56 can be disassembled for cleaning. As discussed earlier, cleaning is a very important aspect for this type of apparatus.

FIG. 4 shows the movement of scoopers 60 relative to the cookie halves as the cookie halves pass by capper wheel 56 on chain 46. Scoopers 60 only pick up uncreamed cookies, and the drawing shows the indexing motion of scoops 60 on capper wheel 56 relative to the cookie halves. It can be seen that an uncreamed cookie half has just been lifted from chain 46 by capper wheel 56. On the opposite side of capper wheel 56, a cookie half is about to be pushed from one of scoops 60 by one of the tall lugs 48 onto a creamed cookie half. Scoops 60 have a first support surface 82 and a second support surface 84. The support surfaces 82 and 84 are connected at one end by a curved surface and form an acute angle relative to one another. First support surface 82 lifts and supports the cookie half as the cookie half is removed from the chain 46 and rotated by capper wheel 56. As best seen in FIG. 5, the cookie half is transferred from the first support surface to the second support surface as the cookie half passes the 90° rotation mark. The first support surface is longer than the second support surface. This ensures that the second support surface does not interfere with the lifting of the cookie half from chain 46.

Figure 7:
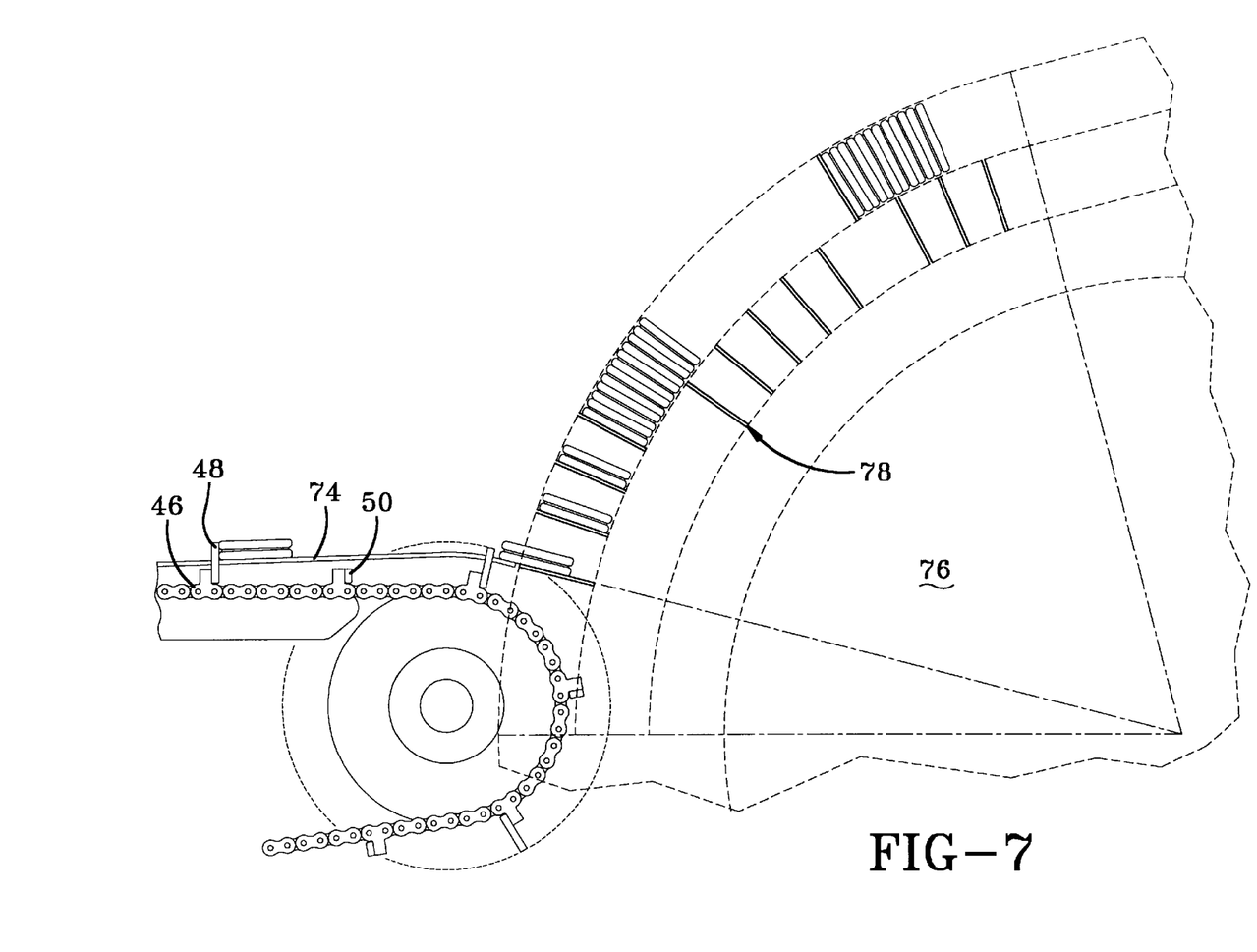
FIG. 7 is a side view of the second chain assembly moving a number of cookie sandwiches into a collector.

As can be seen in FIG. 1 and FIG. 7, once the sandwich cookies leave the capper area, the sandwich cookies are moved by the tall lug 48 up a ramp 74 to a chain driven stacker 76. A series of flights 78 are moved from a radially inward position outwardly between a specified number of cookies. The number of cookies separated by each flight indicates the size of each stack of cookies. As can be appreciated, other types of sorting and stacking machines could be employed with the present invention.

The foregoing description is a specific embodiment of the present invention. It should be appreciated that this embodiment is described for the purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. A sandwich cookie making apparatus, said apparatus comprising:

input means for inputting a plurality of first and second cookie halves into said apparatus;

transport means for moving the first and second cookie halves from said input means along said apparatus;

pushing means fixed on said transport means for engaging the cookie halves as said transport means moves the first and second cookie halves;

depositor means for depositing food additives on each of the first cookie halves after said first cookie halves are moved to said depositor means by said transport means;

capping means for transferring each of the second cookie halves from said transport means along a predetermined path and placing one of the second cookie halves above one of the first cookie halves after the first cookie half has food additive deposited on it by said depositor means;

scooping means arranged on said capping means for lifting each of the second cookie halves from said transport means and supporting the second cookie halves during transferring of the second cookie halves by said capping means to above one of the first cookie halves, wherein said pushing means engages each of the second cookie halves and moves each of the cookie halves one at a time from said scooping means onto one of the first cookie halves to form a cookie sandwich; and collecting means for collecting the sandwich cookies after said capping means makes said first and second cookie halves into sandwich cookies.

2. A cookie making apparatus as described in claim 1, and further comprising:

alignment means for aligning the first and second cookie halves before said first and second cookie halves are transferred from said input means to said transport means.

3. A cookie making apparatus as described in claim 1, wherein said transport means is comprised of a first chain assembly and a second chain assembly, wherein said first chain assembly transports the first and second cookie halves from said input means to said depositor means and to said second chain assembly, and said second chain assembly transports said cookie halves from said first chain assembly to said capping means and then to said collecting means.

4. A cookie making apparatus as described in claim 1, wherein said transport means includes at least one single continuously moving chain assembly.

5. A cookie making apparatus as described in claim 4, wherein said scooping means includes a plurality of scoops, each of said scoops having a first half and a second half wherein said first half engages one side of the second cookie half that hangs over said single chain assembly and said second half of said scoops engages the other side of the second cookie half that hangs over said single chain assembly when one of said scoops lifts one of the second cookie halves from said single chain assembly as said single chain assembly moves the cookie halves along said apparatus.

6. A cookie making apparatus as described in claim 1, wherein said pushing means includes a plurality of alternating pairs of tall lugs and short lugs, said tall lugs pushing the first cookie halves and said short lugs pushing the second cookie halves.

7. A cookie making apparatus as described in claim 6, wherein each of said tall lugs push one of the second cookie halves from said scooping means on to the top of one of the first cookie halves to form a cookie sandwich.

8. A cookie making apparatus as described in claim 1, wherein said capper means rotates the cookie halves along a circular path and inverts the second cookie halves when moving each of the second cookie halves from said transport means to above one of the first cookie halves.

9. A cookie making apparatus as described in claim 8, wherein said scooping means is comprised of a plurality of scoops, each of said scoops having a first wall and a second wall, said first wall engaging and supporting one of the second cookie halves as the second cookie half is lifted from said transport means, and said second wall supporting the second cookie half as it is moved above one of the first cookie halves, said first wall being longer than said second wall and said second cookie half being supported by said first wall until said scoop rotates the second cookie half more than 90°, then moves said second cookie half to said second wall for being supported by said second wall.

10. A cookie making apparatus as described in claim 1, wherein said depositor means includes at least two depositor heads.

11. A cookie making apparatus as described in claim 1, wherein said capping means is comprised of a wheel driven by a drive shaft.

12. A cookie making apparatus as described in claim 11, wherein said wheel is comprised of a first half and a second half opposing said first half, both halves being held on said drive shaft by a hub.

13. A sandwich cookie making apparatus, said apparatus comprising:

input means for inputting a plurality of first and second cookie halves into said apparatus;

depositor means for depositing food additive on each of the first cookie halves;

a first chain assembly and a second chain assembly, said first chain assembly comprising a pair of chains and a series of parallel wires running in the middle of said chains, said chains and said wires moving in a continuous fashion and lug pairs attached to said chains for moving the cookie halves from said input means to said depositor means and then to said second chain assembly, said second chain assembly comprising a single chain that moves in a continuous fashion and includes a plurality of alternating tall lug pairs and short lug pairs affixed thereto, said tall lug pairs push the first cookie halves and said short lug pairs push the second cookie halves;

a capper wheel including a plurality of scoops around the circumference of said capper wheel wherein each of said scoops move one of the second cookie halves from said second chain assembly and rotates said second cookie halves in an indexing fashion to a location above one of said first cookie halves wherein said tall lugs push the second cookie half from said scoop onto the first cookie half to form a cookie sandwich; and collecting means for collecting the sandwich cookies after said first and second cookie halves are formed into a cookie sandwich by said capper wheel, wherein said tall lugs continue pushing the cookie sandwich into said collecting means.

14. A cookie making apparatus as described in claim 13, and further comprising:

alignment means for aligning the first and second cookie halves before said first and second cookie halves are transferred from said input means to said transport means.

15. A cookie making apparatus as described in claim 13, wherein each of said scoops has a first half and a second half wherein said first half engages one side of the second cookie half that hangs over said single chain assembly and said second half of said scoops engages the other side of the second cookie half that hangs over said single chain assembly when said scoops lift each of the second cookie halves from said single chain assembly as said single chain assembly moves the cookie halves along said apparatus.

16. A cookie making apparatus as described in claim 13, wherein each of said scoops has a first and a second wall, said first wall engages and supports one of the second cookie halves as the second cookie half is lifted from said transport means, and said second wall supports the second cookie half as it is moved above one of the first cookie halves, said first wall being longer than said second wall and said second cookie half being supported by said first wall until said scoop rotates the cookie half more than 90°, wherein said second cookie half moves to said second wall for support by said second wall.

17. A cookie making apparatus as described in claim 13, wherein said depositor means includes at least two depositor heads.

18. A cookie making apparatus as described in claim 13, wherein said capper wheel is driven by a drive shaft.

19. A cookie making apparatus as described in claim 18, wherein said wheel is comprised of a first half and a second half opposing said first half, both halves being held on said drive shaft by a hub.

\* \* \* \* \*